(12) United States Patent
Sonoda (10) Patent No.: US 10,409,255 B2
(45) Date of Patent: Sep. 10, 2019

(54) CONTROLLER CONTROL METHOD, AND NON-TRANSITORY COMPUTER-READABLE MEDIUM STORING COMPUTER PROGRAM FOR MACHINE TOOL

(71) Applicant: FANUC CORPORATION, Yamanashi (JP)

(72) Inventor: Naoto Sonoda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 63 days.

(21) Appl. No.: 15/696,821

(22) Filed: Sep. 6, 2017

(65) Prior Publication Data

US 2018/0067466 A1 Mar. 8, 2018

(30) Foreign Application Priority Data

Sep. 7, 2016 (JP) ................................ 2016-174972

(51) Int. Cl.
*G05B 19/29* (2006.01)
*G05B 19/416* (2006.01)

(52) U.S. Cl.
CPC ........... *G05B 19/29* (2013.01); *G05B 19/416* (2013.01); *G05B 2219/34015* (2013.01); *G05B 2219/45044* (2013.01); *G05B 2219/50216* (2013.01)

(58) Field of Classification Search
CPC .............. G05B 19/29; G05B 19/416; G05B 2219/34015; G05B 2219/45044; G05B 2219/50216
See application file for complete search history.

(56) References Cited

U.S. PATENT DOCUMENTS

| | | | |
|---|---|---|---|
| 2003/0066179 A1* | 4/2003 | Shiba ................. | B23Q 11/0042 29/426.3 |
| 2014/0102268 A1 | 4/2014 | Hariki et al. | |
| 2016/0011579 A1 | 1/2016 | Watanabe et al. | |

FOREIGN PATENT DOCUMENTS

| | | |
|---|---|---|
| JP | 5033929 B1 | 9/2012 |
| JP | 2014-54689 A | 3/2014 |

(Continued)

*Primary Examiner* — Mark A Connolly
(74) *Attorney, Agent, or Firm* — Studebaker & Brackett PC (57) ABSTRACT

To provide a controller for a machining device that controls oscillation of a cutting tool used for oscillating cutting to become capable of reducing a probability of interference between an interfering object existing near a work as a cutting target and the cutting tool. A controller for control over a machine tool comprises: a position command acquiring unit that acquires a position command directed to a servo motor for driving a cutting tool; a rotation speed acquiring unit that acquires a rotation speed of the cutting tool; an acceleration calculating unit that calculates an acceleration of the servo motor based on the position command; an oscillation command calculating unit that calculates an oscillation command based on the position command and the rotation speed, the calculated oscillation command causing the cutting tool and the work to oscillate relative to each other along a machining route; an offset value calculating unit that calculates an offset value based on the acceleration; an offset unit that offsets amplitude of the oscillation command; and a driving unit that outputs a drive signal to be used for driving the servo motor based on the oscillation command including the offset amplitude and the position command.

12 Claims, 7 Drawing Sheets

(56) References Cited

FOREIGN PATENT DOCUMENTS

| | | |
|---|---|---|
| JP | 5599523 B1 | 10/2014 |
| JP | 2015-225518 A | 12/2015 |
| WO | 2015/162739 A1 | 10/2015 |

* cited by examiner

CONTROLLER, CONTROL METHOD, AND NON-TRANSITORY COMPUTER-READABLE MEDIUM STORING COMPUTER PROGRAM FOR MACHINE TOOL

This application is based on and claims the benefit of priority from Japanese Patent Application No. 2016-174972, filed on 7 Sep. 2016, the content of which is incorporated herein by reference.

BACKGROUND OF THE INVENTION

Field of the Invention

The present invention relates to a controller, a control method, and a non-transitory computer-readable medium storing a computer program for a machine tool used for machining by cutting of a work by means of coordinated motion of multiple axes.

Related Art

There is a machine tool conventionally known used for machining by cutting of a work as a machining target by means of coordinated motion of multiple axes. According to a machining method employed in some cases for such a machine tool, to shred chips caused by cutting, a cutting tool and a work are caused to oscillate relative to each other in a machining direction.

For example, patent document 1 mentioned below discloses a technique of machining by cutting performed by causing a cutting tool to vibrate at a low frequency. The technique of patent document 1 has a control mechanism that causes the cutting tool to vibrate at a low frequency in a 2-axis direction by controlling a cutting tool feed drive motor. The cutting tool is fed by being synchronized at least in the 2-axis direction, in a manner that depends on the number of rotations of a work or the number of rotations of the cutting tool and the amount of feed of the cutting tool during one rotation of the work or that of the cutting tool. The following data is stored in advance in the form of a table as data that allows actual operation at a low frequency of 25 Hz or more: the amount of forward motion, the amount of backward motion, a forward motion speed, and a backward motion speed of a cutting tool feed mechanism that is responsive to mechanical characteristics on a table such as mass and motor characteristics. Based on the stored data, the cutting tool feed drive motor is controlled. Patent document 1 recites that, by realizing cutting by generating low-frequency vibration optimally, chips are shredded to make it unlikely that the chips will become attached to the cutting tool.

However, patent document 1 does not allow for interference with a peripheral object to be caused if the position of the cutting tool is oscillated by the vibration (oscillation) at a low frequency. Hence, the technique of patent document 1 becomes applicable only if there is no interfering object near a position the cutting tool might reach. Thus, applying this technique is considered to be difficult if a segment different from a segment as a target of machining by cutting or an object different from the target exists near the target.

Patent document 2 mentioned below discloses a technique by which an oscillation command is generated so as to allow application of vibration along a machining route based on given vibration conditions such as frequency and amplitude. For example, the generated oscillation command is superimposed on a machining command, and a resultant command is distributed to servo control on each axis. More specifically, to move a tool along a movement route relative to a machining target, the tool is caused to vibrate so as to trace the movement route. A command stroke (a stroke given by a movement command) in a unit of time (an interpolation cycle) is determined using the movement command including the movement route indicating a machining position and a machining speed. A vibration stroke, which is a stroke resulting from vibration occurring in this unit of time at a moment corresponding to the movement command, is determined using the vibration conditions including frequency and amplitude. The command stroke and the vibration stroke are combined to determine a composite stroke. Then, a stroke in the unit of time is determined in such a manner that a position determined after movement of the composite stroke is located on a curve movement route. Patent document 2 recites that this method achieves machining under various conditions without the need of preparing a table storing vibration conditions for a tool.

Regarding patent document 2, however, applying high-frequency oscillation is considered to cause a probability of failing to give a command precisely, for example. This is considered to become a problematic issue, particularly if an oscillation frequency is increased to approach a command distribution frequency. If the command distribution frequency is 100 Hz and the oscillation frequency is 50 Hz, for example, commands can be given to only two points during one oscillation cycle. This tendency becomes more noticeable if the oscillation frequency is increased further to get closer and closer to the command distribution frequency, and it is considered to make it difficult in some cases to exert elaborate control. Difficulty in exerting elaborate control may cause a situation where, if a segment different from a segment as a machining target or a part different from the target exists near a command route for a cutting tool, for example, the cutting tool interferes with such a different segment or such a different part (called an interfering object). Thus, applying the technique of patent document 2 is difficult if a certain interfering object exists near the command route for the cutting tool.

As described above, the conventional technique of controlling a machine tool using oscillation has been considered to cause a probability that a cutting tool will be moved from a primary command route by amplitude of oscillation (called oscillation amplitude) as a result of the oscillation applied to the cutting tool. This causes a risk of interference of the cutting tool with an interfering object, if the interfering object exists near a segment as a cutting target.

Patent Document 1: Japanese Patent No. 5033929
Patent Document 2: Japanese Patent No. 5599523

SUMMARY OF THE INVENTION

The present invention has been made in view of the aforementioned problem. The present invention is intended to provide a controller, a control method, and a non-transitory computer-readable medium storing a computer program for a machine tool that control oscillation of the machine tool used for oscillating cutting to become capable of reducing a probability of interference between a tool for machining and an interfering object, even if the interfering object exists near a command route for a work as a cutting target.

The present inventors have found the principle of control over a range of movement of a cutting tool by adding a predetermined offset to oscillation amplitude, thereby achieving the present invention.

(1) A controller according to the present invention (a servo controller 100 described later, for example) is a controller that controls a machine tool comprising multiple control axes and used for machining by cutting of a work (a work 10 or 20 described later, for example) as a machining target by means of coordinated motion of the control axes. The controller comprises: a position command acquiring unit (a position command acquiring unit 120 described later, for example) that acquires a position command directed to a servo motor (a servo motor 400 described later, for example) for driving a cutting tool or a position command directed to a servo motor for driving the work; a rotation speed acquiring unit (a rotation speed acquiring unit 118 described later, for example) that acquires a rotation speed of the rotated cutting tool or that of the rotated work; an acceleration calculating unit (an acceleration calculating unit 104 described later, for example) that calculates an acceleration of the servo motor based on the acquired position command; an oscillation command calculating unit (an oscillation command calculating unit 102 described later, for example) that calculates an oscillation command based on the acquired position command and the acquired rotation speed, the calculated oscillation command causing the cutting tool and the work to oscillate relative to each other in a machining direction along a machining route along which the cutting tool travels; an offset value calculating unit (an offset value calculating unit 106 described later, for example) that calculates an offset value based on the calculated acceleration; an offset unit (an oscillation command correcting unit 108 described later, for example) that offsets amplitude of the calculated oscillation command by adding the calculated offset value to the amplitude; and a driving unit (a position, speed, and current control unit 116 and an adder 110 described later, for example) that determines a drive signal to be used for driving the servo motor based on the oscillation command including the offset amplitude and the acquired position command, and outputs the drive signal.

(2) In the controller described in (1), the oscillation command calculating unit may calculate the oscillation command for shredding chips caused during the machining by cutting.

(3) In the controller described in (1) or (2), the oscillation command calculating unit may comprise: an oscillation frequency calculating unit (the oscillation command calculating unit 102 described later, for example) that calculates an oscillation frequency based on the acquired rotation speed; and an oscillation amplitude calculating unit (the oscillation command calculating unit 102 described later, for example) that calculates the oscillation amplitude based on the acquired position command and the acquired rotation speed.

(4) In the controller described in (3), the oscillation amplitude calculating unit may calculate the oscillation amplitude by determining a stroke during one rotation of the cutting tool or that of the work based on the acquired position command and the acquired rotation speed and by multiplying the determined stroke by a first constant.

(5) In the controller described in (3), the oscillation frequency calculating unit may calculate the oscillation frequency by multiplying the acquired rotation speed by a second constant.

(6) In the controller described in any one of (1) to (3), the acceleration calculating unit may calculate the acceleration based on a position feedback value about the servo motor.

(7) In the controller described in any one of (1) to (6), the offset unit may offset the amplitude of the calculated oscillation command by acquiring an offset value from an external higher-order controller (a higher-order controller 200 described later, for example) instead of using the offset value calculated by the offset value calculating unit and by adding the acquired offset value to the amplitude.

(8) In the controller described in any one of (1) to (6), the offset value calculating unit may determine an offset value in a direction of the machining route if operation being performed by the servo motor is determined to be operation in an operation start period (an operation start period S described later, for example) based on the acceleration.

(9) In the controller described in any one of (1) to (6), the offset value calculating unit may determine an offset value in a direction opposite a direction of the machining route if operation being performed by the servo motor is determined to be operation in an operation termination period (an operation termination period T described later, for example) based on the acceleration.

(10) In the controller described in any one of (1) to (6), the offset value calculating unit may determine an offset value in a direction of the machining route or in a direction opposite a direction of the machining route if operation being performed by the servo motor is determined to be operation in an operation start period or operation in an operation termination period based on the acceleration, and the offset value calculating unit may determine an offset value to be zero if the operation being performed is determined to be operation in a period other than the operation start period and the operation termination period.

(11) A control method according to the present invention is a method of controlling a machine tool comprising multiple control axes and used for machining by cutting of a work as a machining target by means of coordinated motion of the control axes. The method comprises: a position command acquiring step of acquiring a position command directed to a servo motor for driving a cutting tool or a position command directed to a servo motor for driving the work; a rotation speed acquiring step of acquiring a rotation speed of the rotated cutting tool or that of the rotated work; an acceleration calculating step of calculating an acceleration of the servo motor based on the acquired position command; an oscillation command calculating step of calculating an oscillation command based on the acquired position command and the acquired rotation speed, the calculated oscillation command causing the cutting tool and the work to oscillate relative to each other in a machining direction along a machining route along which the cutting tool travels; an offset value calculating step of calculating an offset value based on the calculated acceleration; an offset step of offsetting amplitude of the calculated oscillation command by adding the calculated offset value to the amplitude; and a driving step of determining a drive signal to be used for driving the servo motor based on the oscillation command including the offset amplitude and the acquired position command, and outputting the drive signal.

(12) A non-transitory computer-readable medium storing a computer program according to the present invention causes a computer to operate as a controller that controls a machine tool comprising multiple control axes and used for machining by cutting of a work as a machining target by means of coordinated motion of the control axes. The computer program causes the computer to execute: a position command acquiring procedure of acquiring a position command directed to a servo motor for driving a cutting tool or a position command directed to a servo motor for driving the work; a rotation speed acquiring procedure of acquiring a rotation speed of the rotated cutting tool or that of the rotated work; an acceleration calculating procedure of calculating an acceleration of the servo motor based on the acquired position command; an oscillation command calculating procedure of calculating an oscillation command based on the acquired position command and the acquired rotation speed, the calculated oscillation command causing the cutting tool and the work to oscillate relative to each other in a machining direction along a machining route along which the cutting tool travels; an offset value calculating procedure of calculating an offset value based on the calculated acceleration; an offset procedure of offsetting amplitude of the calculated oscillation command by adding the calculated offset value to the amplitude; and a driving procedure of determining a drive signal to be used for driving the servo motor based on the oscillation command including the offset amplitude and the acquired position command, and outputting the drive signal.

According to the present invention, amplitude of oscillation is offset in one or both of the operation start period and the operation termination period of the machining by cutting. This can reduce a probability of interference between the cutting tool and the machining route (command route) (interference between the cutting tool and a segment or a part (interfering object) existing near the cutting tool).

DETAILED DESCRIPTION OF THE INVENTION

Examples of an embodiment of the present invention will be described below. A servo controller described in this embodiment is for a machine tool comprising multiple control axes. The servo controller is for making the machine tool used for machining by cutting of a work as a machining target perform intermittent cutting by causing a cutting tool and the work to oscillate relative to each other, particularly in a machining direction, thereby shredding chips.
<Explanation of Principle of Oscillating Motion>

Figure 1A:
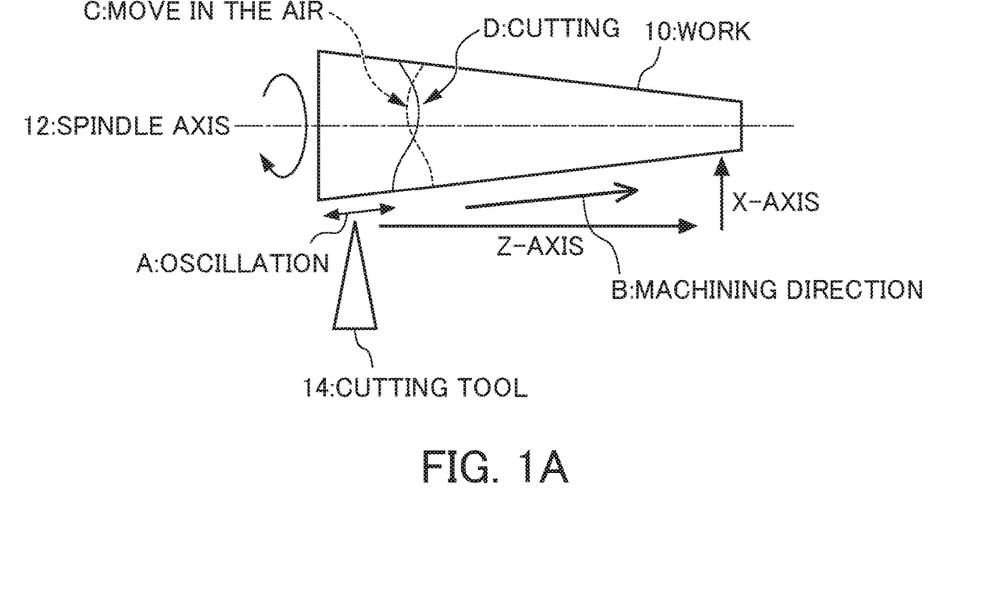
FIG. 1A is an explanatory view showing how machining by cutting is performed by oscillation.
Figure 1B:
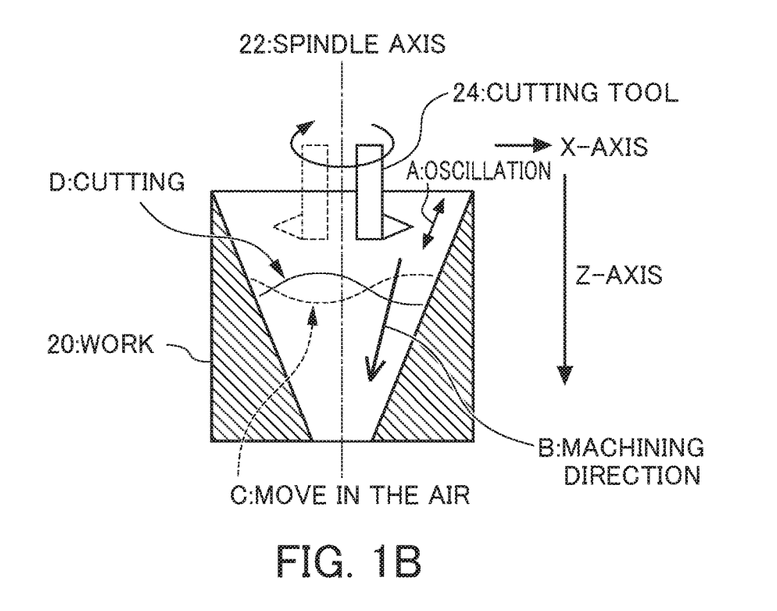
FIG. 1B is an explanatory view showing how machining by cutting is performed by oscillation.

FIGS. 1A and 1B are each an explanatory view for explaining oscillating motion. FIG. 1A is an explanatory view showing how a surface of a work 10 is subjected to machining by cutting with a cutting tool 14 while the work 10 is rotated about a spindle axis 12 as a rotary axis. As shown in FIG. 1A, an axis extending in the same direction as the spindle axis 12 is a Z-axis, and one of the axes orthogonal to the spindle axis 12 is an X-axis. The cutting tool 14 is used for cutting the surface of the work 10 based on a predetermined program. This machining proceeds along the Z-axis or in a machining direction B at a predetermined angle from the Z-axis. A direction in which the machining proceeds in this way is called the machining direction B.

During the aforementioned machining by cutting, oscillation A is applied to the cutting tool 14 in the machining direction B. The oscillation A is expected to achieve fine shredding of chips, for example. The oscillation A generates what is called vibration of the cutting tool 14 in the machining direction. The cutting tool 14 is to be placed in a contacting state and a non-contacting state with the work 10 repeatedly. If the cutting tool 14 contacts the work 10, the cutting tool 14 moves on the surface of the work 10 along a path of cutting D shown in FIG. 1A. If the cutting tool 14 does not contact the work 10, the cutting tool 14 moves on the surface of the work 10 along a path of move in the air C shown in FIG. 1A. The aforementioned intermittent cutting achieves fine shredding of chips or effective cooling of the cutting tool 14.

FIG. 1B is an explanatory view showing a different example of oscillation of a cutting tool. FIG. 1B is an explanatory view showing how a work 20 with an internal cavity is subjected to machining by cutting inside the cavity with a cutting tool 24. In FIG. 1B, the cutting tool 24 rotates relative to the work 20 and the axis of the cutting tool 24 functions as a spindle axis. Specifically, in this specification, a spindle axis means the following two axes. In FIG. 1A, the spindle axis 12 means an axis about which the work 10 rotates. In FIG. 1B, the spindle axis 22 means an axis about which the cutting tool 24 rotates. Like in FIG. 1A, an axis extending in the same direction as the spindle axis 22 in FIG. 1B is the Z-axis, and one of the axes orthogonal to the spindle axis 22 in FIG. 1B is the X-axis. The cutting tool 24 is used for cutting a surface of the inside of the cavity of the work 20 based on a predetermined program. Like in FIG. 1A, this machining proceeds in the machining direction B.

In FIG. 1B, the oscillation A is also applied to the cutting tool 24 in the machining direction B and the cutting tool 24 is also to be placed in a contacting state and a non-contacting state with the work 20 repeatedly. If the cutting tool 24 contacts the work 20, the cutting tool 24 moves on the surface of the work 20 along a path of the cutting D shown in FIG. 1B. If the cutting tool 24 does not contact the work 20, the cutting tool 24 moves on the surface of the work 20 along a path of move in the air C shown in FIG. 1B. FIGS. 1A and 1B both show the examples where the cutting tools 14 and 24 are caused to oscillate. Alternatively, the configuration may also be such that the work 10 or 20 is caused to oscillate.

According to the conventional technique, oscillation is achieved by giving a command for the oscillation in addition to a primary command to a servo motor for driving the cutting tool 14 (24), etc. For example, conventionally, instruction for oscillation is given in consideration of only a command (a position command or a rotation speed of a spindle axis) at the time of the instruction. Thus, if an interfering object to interfere with a cutting tool exists near a route for the cutting tool, the interfering object and the cutting tool might interfere with each other. A servo controller suggested in this embodiment adjusts this oscillating motion in an initial period of machining operation (called an operation start period S) or a termination period of the machining operation (called an operation termination period T), thereby allowing reduction in a probability of interference with an interfering object existing near a machining route. This adjustment of the oscillating motion is realized by adding an offset value to amplitude of oscillation.

In particular, the servo controller according to this embodiment characteristically adds an offset value responsive to a command acceleration to an oscillation command. Specifically, if an acceleration is large in a positive direction (machining direction), operation being performed is determined to be operation in the operation start period S (initial period of operation). Then, an offset value in the machining direction is added to amplitude of oscillation. This offset value is called a forward offset. If an acceleration is large in a negative direction (direction opposite the machining direction), operation being performed is determined to be operation in the operation termination period T (termination period of operation). Then, an offset value in a direction opposite the machining direction is added to amplitude of oscillation. This offset value is called a backward offset. In the example described in this embodiment, amplitude of oscillation is offset both in the operation start period and the operation termination period. Alternatively, amplitude of oscillation may be offset only in one of the operation start period and the operation termination period. A route mentioned in this specification means a machining route. More specifically, this machining route is a route along which a cutting tool is to move (to be followed by the cutting tool) in response to a position command directed to the cutting tool, for example. The machining route is also called a command route.

As described above, according to this embodiment, an offset value is determined based on a command acceleration. The determined offset value is added to an oscillation command (amplitude of the oscillation command). Alternatively, the offset value may be provided from a controller of a higher order (called a higher-order controller). The higher-order controller outputs a position command over machining operation by a cutting tool. Thus, the higher-order controller is considered to be capable of recognizing the operation start period S and the operation termination period T. For this reason, it may be preferable that the higher-order controller provide an offset value to be added to amplitude of an oscillation command. The oscillation command basically includes a frequency of oscillation (called an oscillation frequency) and amplitude of the oscillation (called oscillation amplitude). The oscillation command may additionally include various parameters. The oscillation command may include the amount of feed of a cutting tool, the amount of forward motion, the amount of backward motion, a forward motion speed, and a backward motion speed of the cutting tool, for example.

<Configuration>

Figure 2:
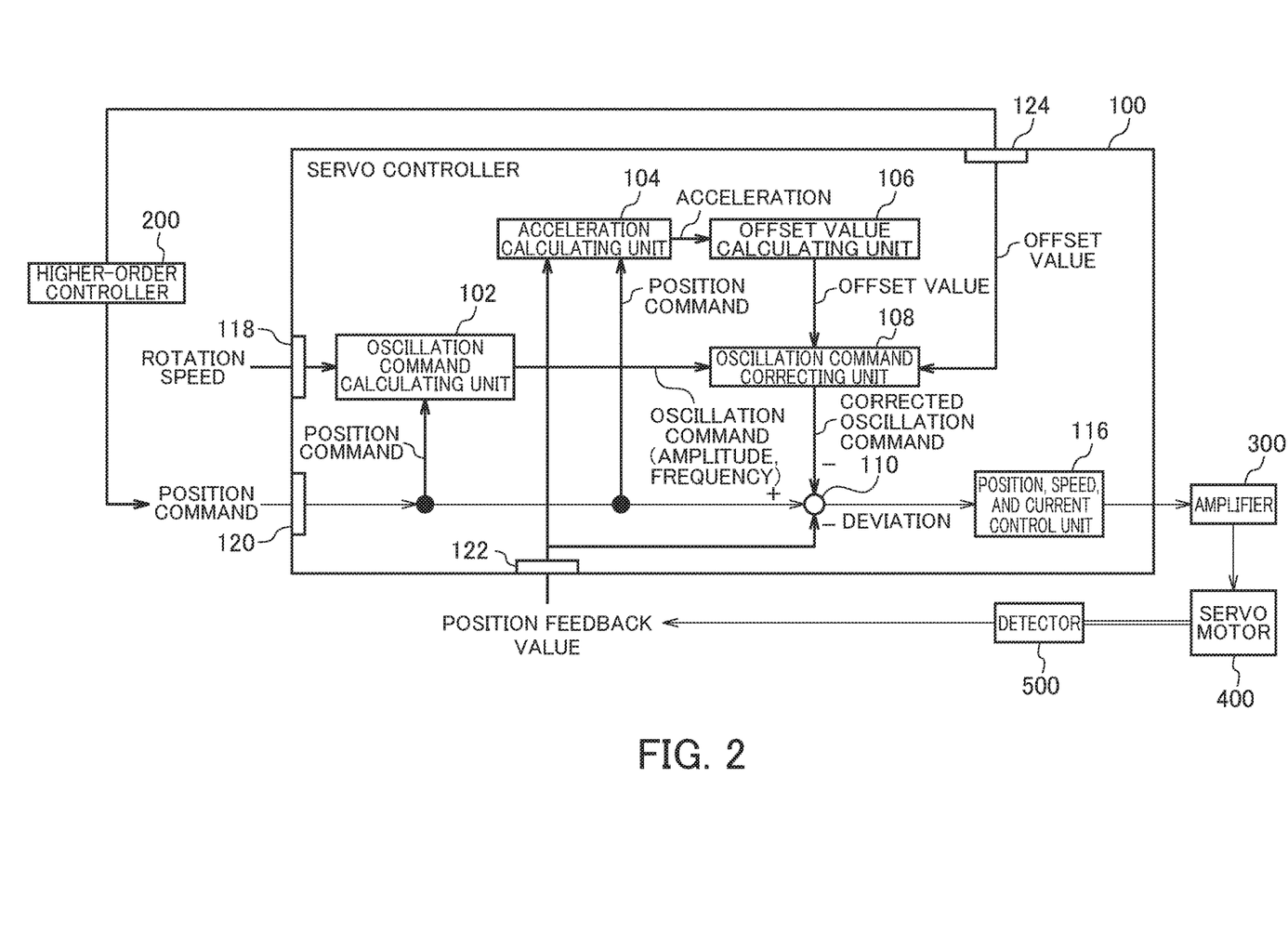
FIG. 2 is a configurational block diagram of a servo controller according to a preferred embodiment of the present invention.

The configuration of a servo controller 100 according to this embodiment will be described next based on the drawings. FIG. 2 is a configurational block diagram of the servo controller 100 according to this embodiment. As shown in FIG. 2, a higher-order controller 200 outputs a position command. The servo controller 100 drives a servo motor 400 for a machine tool (not shown in the drawings) to control a cutting tool of the machine tool or a work so as to comply with the position command. The servo controller 100 corresponds to a preferred example of a controller according to Claims. The higher-order controller 200 is a higher-order controller for control over the machine tool through the servo controller 100. For example, the higher-order controller 200 can be configured as a computer. As another example, the higher-order controller 200 may be configured as a control console or a control panel to be operated by a user. As another example, the higher-order controller 200 may be configured as an administration device (administration computer) responsible for administration of multiple machine tools in an integrated fashion. As a different example, the higher-order controller 200 may be configured as a controller (control computer) responsible for overall control of a factory.

The servo controller 100 is preferably formed of a computer including a CPU and a memory. Each unit described below (each calculating unit, a control unit, etc.) can be realized by execution of a predetermined program in the memory by the CPU. A non-transitory computer-readable medium storing this program corresponds to a preferred example of a non-transitory computer-readable medium storing a computer program according to Claims. The servo controller 100 according to this embodiment comprises an oscillation command calculating unit 102, an acceleration calculating unit 104, an offset value calculating unit 106, an oscillation command correcting unit 108, and a position, speed, and current control unit 116.

The oscillation command calculating unit 102 calculates an oscillation command based on a rotation speed of a spindle axis and a position command output from the higher-order controller 200. The acceleration calculating unit 104 calculates an acceleration of the servo motor 400. The acceleration is calculated by two methods: a method based on a position command; and a method based on a position feedback value. These methods will be described in detail later. The offset value calculating unit 106 calculates an offset value based on the acceleration calculated by the acceleration calculating unit 104. The oscillation command correcting unit 108 corrects the oscillation command by adding the offset value to the oscillation command. The offset value to be used may be the offset value calculated by the offset value calculating unit 106 or may be an offset value provided from the higher-order controller 200. These usages will be described in detail later. The position, speed, and current control unit 116 determines a drive signal to be given to the servo motor 400 by adding the corrected oscillation command to the position command.

The servo controller 100 further includes a rotation speed acquiring unit 118 that acquires a rotation speed of a spindle axis, a position command acquiring unit 120 that acquires a position command from the higher-order controller 200, and a position acquiring unit 122 that acquires a position feedback value. A rotation speed of the spindle axis may be the number of rotations per minute (per second), or may be an angular speed. Each of these acquiring units is preferably configured by using an input interface of a computer, a program that acquires information by controlling the input interface, and a CPU that executes the program. A non-transitory computer-readable medium storing this program also corresponds to a preferred example of the non-transitory computer-readable medium storing a computer program according to Claims. Each of these acquiring units may include a buffer for storing data received from outside, for example.

<Operation>

The operation of the servo controller 100 will be described in detail below based on the configurational block diagram of FIG. 2, the operation explanatory graphs or views of FIGS. 3, 4, 5A, and 5B, and the flowchart of FIG. 6. The position command acquiring unit 120 is an interface that acquires a position command directed to the servo motor 400 for driving a cutting tool or a position command directed to the servo motor 400 for driving the work 10 (20), both output from the higher-order controller 200. The position command acquired by the position command acquiring unit 120 is supplied to the oscillation command calculating unit 102, the acceleration calculating unit 104, and an adder 110. The position command acquiring unit 120 corresponds to a preferred example of a position command acquiring unit according to Claims. Additionally, the operation of acquiring the position command performed by the position command acquiring unit 120 corresponds to a position command acquiring step as step S1 of FIG. 6.

The rotation speed acquiring unit 118 is an interface that acquires a rotation speed of a spindle axis of the rotated work or that of a spindle axis of the rotated cutting tool. The acquired rotation speed is supplied to the oscillation command calculating unit 102. The rotation speed acquiring unit 118 corresponds to a preferred example of a rotation speed acquiring unit according to Claims. The operation of acquiring the rotation speed of the spindle axis performed by the rotation speed acquiring unit 118 corresponds to a rotation speed acquiring step as step S2 in the flowchart of FIG. 6. A rotation speed mentioned in this embodiment may be a rotation speed of the cutting tool or that of the work. A rotation speed may be acquired using a rotation speed sensor provided on the spindle axis of the cutting tool, for example. Alternatively, a rotation speed may be determined based on the rate of time change of a position command output from the higher-order controller 200. Still alternatively, a rotation speed is preferably determined based on the rate of change (or a differential) of a position feedback value detected by a detector 500 for detecting an angle of rotation of the servo motor 400 described later.

The acceleration calculating unit 104 calculates an acceleration of the servo motor 400 based on the position command. A speed is obtained by differentiating the position of the servo motor 400. An acceleration is obtained by differentiating the speed. In some cases, the obtained acceleration is called a command acceleration. This operation by the acceleration calculating unit 104 is also realized by execution of a program describing this operation by the acceleration calculating unit 104 by the CPU of the servo controller 100. This program is stored in a certain storage device in the servo controller 100. Alternatively, it may be stored in an external storage device. A non-transitory computer-readable medium storing this program also corresponds to a preferred example of the non-transitory computer-readable medium storing a computer program according to Claims. One of characteristics of this embodiment is that, by calculating the acceleration in the above-described manner, operation being performed by the servo motor 400 is determined to be operation in the operation start period S, operation in the operation termination period T, or operation in a period other than the operation start period S and the operation termination period T. Based on this determination, an oscillation command (amplitude of the oscillation command) for a tool can be offset.

Preferably, the acceleration calculating unit 104 calculates an actual acceleration based not on a position command but on an actual motion of the servo motor 400. Such calculation of an acceleration is considered to achieve calculation of a more correct acceleration value based on the actual motion. The position of the servo motor 400 is detected by the detector 500 shown in FIG. 2 and is output as a position feedback value. The position feedback value is introduced into the servo controller 100 through the position acquiring unit 122. The position acquiring unit 122 feeds the acquired position feedback value to the acceleration calculating unit 104 and the adder 110.

The acceleration calculating unit 104 can determine an acceleration by detecting an actual position of the servo motor 400 using this position feedback value instead of a position command, differentiating the detected position to calculate a speed, and differentiating the calculated speed. An acceleration can be detected based on actual motion of the servo motor 400. This is considered to achieve a higher degree of correctness of a resultant acceleration, compared to calculation of an acceleration based on a position command provided from the higher-order controller 200. Meanwhile, using a value obtained as a feedback of the actual motion of the servo motor 400 is considered to cause some delay in calculation of an acceleration, compared to using a position command from the higher-order controller 200. The acceleration calculating unit 104 corresponds to a preferred example of an acceleration calculating unit according to Claims. The above-described operation for determining an acceleration performed by the acceleration calculating unit 104 corresponds to an acceleration calculating step as step S3 of FIG. 6.

Next, the oscillation command calculating unit 102 calculates an oscillation command based on the acquired position command and the acquired rotation speed. More specifically, according to this embodiment, the oscillation command calculating unit 102 calculates an oscillation command by exerting a procedure described below based on the position command output from the higher-order controller 200. The following calculations are also performed by execution of a program describing the function of the oscillation command calculating unit 102 by the CPU of the servo controller 100. A non-transitory computer-readable medium storing this program also corresponds to a preferred example of the non-transitory computer-readable medium storing a computer program according to Claims.

First, the oscillation command calculating unit 102 calculates oscillation amplitude based on the acquired position command and the acquired rotation speed. For example, the oscillation command calculating unit 102 may determine the amount of feed during one rotation of the spindle axis based on the position command and the rotation speed of the spindle axis, and set oscillation amplitude by multiplying the determined amount of feed during one rotation by 1.5, for example. This numerical value, 1.5, corresponds to a preferred example of a first constant according to Claims. The oscillation command calculating unit 102 responsible for calculation of oscillation amplitude corresponds to a preferred example of an oscillation amplitude calculating unit according to Claims. The operation of calculating the oscillation amplitude performed by the oscillation command calculating unit 102 corresponds to part of an oscillation command calculating step as step S4 of FIG. 6.

Next, the oscillation command calculating unit 102 calculates an oscillation frequency based on the acquired rotation speed. For example, the oscillation command calculating unit 102 preferably determines a value by multiplying the rotation speed by 1.5, and sets a resultant value as an oscillation frequency. This numerical value, 1.5, corresponds to a preferred example of a second constant according to Claims. The oscillation command calculating unit 102 responsible for calculation of an oscillation frequency corresponds to a preferred example of an oscillation frequency calculating unit according to Claims. The operation of calculating the oscillation frequency performed by the oscillation command calculating unit 102 corresponds to part of the oscillation command calculating step as step S4 of FIG. 6.

Next, the oscillation command calculating unit 102 calculates an oscillation command based on the calculated oscillation amplitude and the calculated oscillation frequency. The calculated oscillation command is transmitted to the servo motor 400 together with the position command output from the higher-order controller 200. By doing so, oscillating motion is added to movement of the cutting tool (or work). The oscillation command calculating unit 102 responsible for calculation of an oscillation command corresponds to a preferred example of an oscillation command calculating unit according to Claims. The operation of calculating the oscillation command performed by the oscillation command calculating unit 102 corresponds to part of the oscillation command calculating step as step S4 of FIG. 6.

Next, the offset value calculating unit 106 calculates an offset value to be added to the oscillation command based on the acceleration calculated by the acceleration calculating unit 104. This operation is also realized by execution of a program describing this operation by the offset value calculating unit 106 by the CPU of the servo controller 100. This program is stored in a certain storage device in the servo controller 100. Alternatively, it may be stored in an external storage device. A non-transitory computer-readable medium storing this program also corresponds to a preferred example of the non-transitory computer-readable medium storing a computer program according to Claims.

<Operation Start Period S, Operation Termination Period T>

Figure 3:
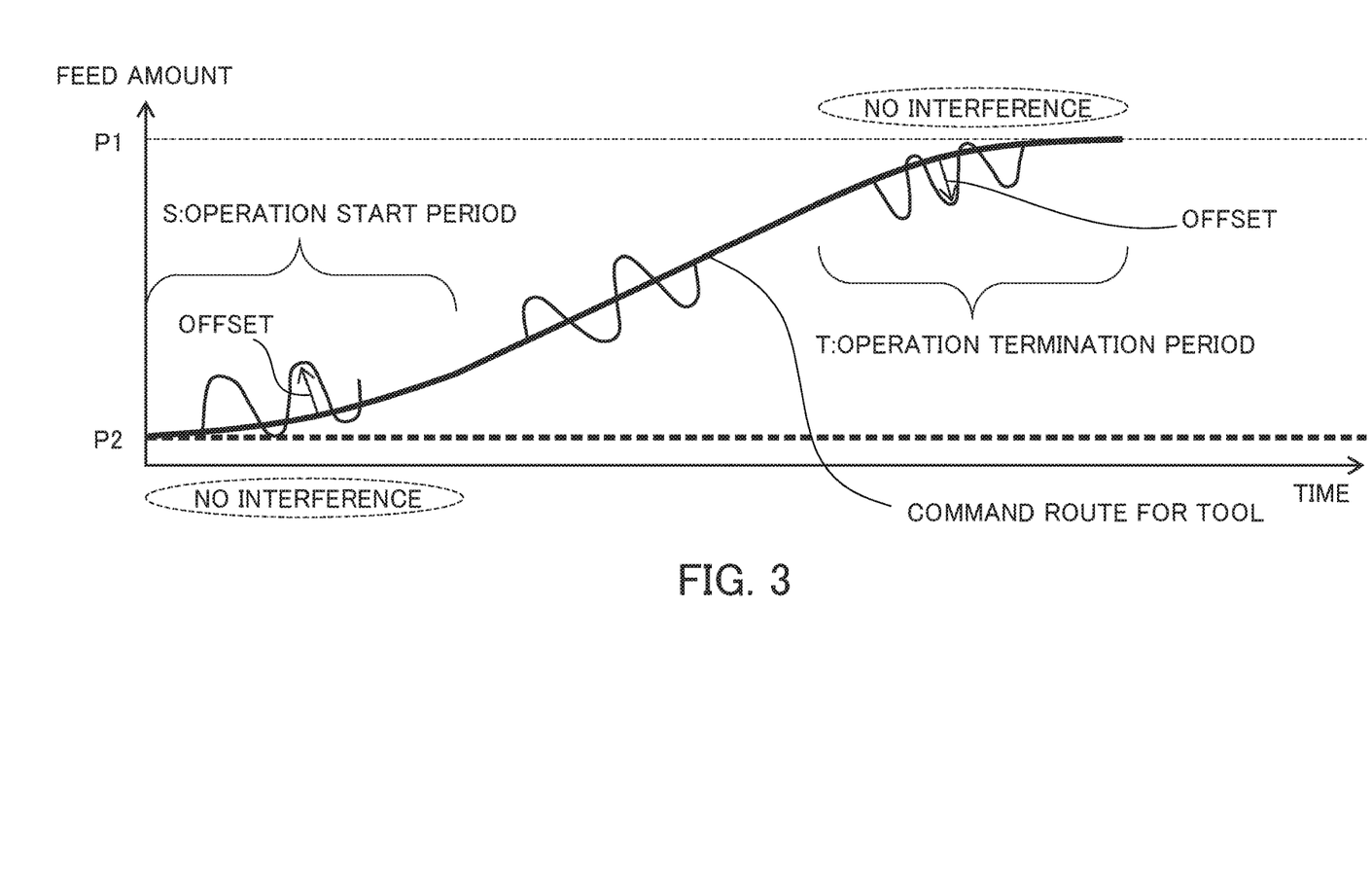
FIG. 3 is a graph showing the operation of the servo controller according to the preferred embodiment of the present invention.

If the calculated acceleration takes a positive value, the offset value calculating unit 106 determines that the servo motor 400 is performing operation in the operation start period S. If operation being performed is determined to be operation in the operation start period S, the offset value calculating unit 106 determines an offset value in a machining route direction. FIG. 3 is a graph showing a relationship between the amount of feed, specifically, the position of the servo motor 400 and time. The machining operation described herein as an example is such that the servo motor 400 starts moving from a position P2 and then stops at a position P1 where the servo motor 400 finishes the machining operation. In the illustration of FIG. 3, a period where an acceleration takes a positive value after the servo motor 400 starts moving is determined to be the operation start period S. Specifically, this period means a period where the servo motor 400 is accelerated. Conversely, the period where the servo motor 400 is accelerated is determined to be an initial period after the machining operation is started, specifically, the operation start period S.

Characteristically, according to this embodiment, if the offset value calculating unit 106 determines that operation being performed is operation in the operation start period S based on an acceleration, the offset value calculating unit 106 determines (calculates) an offset value in the machining route direction. By determining the offset value in the machining route direction, specifically, in a direction in which the servo motor 400 moves, amplitude of oscillation can be offset in the machining route direction. By doing so, the cutting tool can be controlled so as to always move toward the position P1 to be away from the position P2 as a start position. As a result, even if an interfering object Q exists on a side opposite the position P1 as a destination of movement of the cutting tool as viewed from the position P2, a probability of movement of the cutting tool toward the interfering object Q resulting from the oscillating motion can be reduced. FIG. 3 shows such oscillation of the cutting tool. As shown in FIG. 3, the oscillating motion of predetermined amplitude and a predetermined frequency is superimposed on a command route for the tool. By offsetting this amplitude toward the position P1, the cutting tool is controlled so as not to move toward a direction opposite the position P1 as viewed from the position P2. Thus, if the interfering object Q exists near the position P2 (and on the opposite side of the position P1), a probability of interference with the interfering object Q can be reduced. If the acceleration is substantially zero, the offset value calculating unit 106 determines that operation being performed is not operation in the operation start period S nor operation in the operation termination period T. Then, the offset value calculating unit 106 determines (calculates) the offset value to be zero.

In contrast, if the calculated acceleration takes a negative value, the offset value calculating unit 106 determines that the servo motor 400 is performing operation in the operation termination period T. If operation being performed is determined to be operation in the operation termination period T, the offset value calculating unit 106 calculates an offset value in a direction opposite the machining route direction. In the illustration of FIG. 3, the servo motor 400 starts moving from the position P2 and stops at the position P1 where the servo motor 400 finishes the machining operation. In the illustration of FIG. 3, a period where the servo motor 400 approaches the position P1 and an acceleration takes a negative value is the operation termination period T. Specifically, this period means a period where the servo motor 400 is decelerated. Conversely, the period where the servo motor 400 is decelerated is determined to be a period immediately before termination of the machining operation, specifically, the operation termination period T.

Characteristically, according to this embodiment, if the offset value calculating unit 106 determines that operation being performed is operation in the operation termination period T based on an acceleration, the offset value calculating unit 106 determines (calculates) an offset value in the direction opposite the machining route direction. By determining the offset value in the direction opposite the machining route direction, specifically, in a direction in which the servo motor 400 moves from the termination position P1 toward the start position P2, amplitude of oscillation can be offset toward the start position P2, specifically, in the direction opposite the machining route direction. By doing so, the cutting tool can be controlled so as to always move toward the start position P2 to be away from the termination position P1. As a result, even if the interfering object Q exists on a side opposite the start position P2 as viewed from the position P1, a probability of movement of the cutting tool toward the interfering object Q resulting from the oscillating motion can be reduced. FIG. 3 shows such oscillation of the cutting tool. As shown in FIG. 3, the oscillating motion of predetermined amplitude and a predetermined frequency is superimposed on the command route for the tool. By offsetting this amplitude toward the position P2, the cutting tool is controlled so as not to move toward a direction opposite the position P2 as viewed from the position P1. Thus, if the interfering object Q exists near the position P1 (and on the opposite side of the position P2), a probability of interference with the interfering object Q can be reduced.

As a result, a probability of outward deviation of the cutting tool from the machining route resulting from the oscillating motion is reduced. Thus, even if the interfering object Q of some kind exists near the machining route, probability of interference with the interfering object Q can still be reduced (see FIG. 3). The offset value calculating unit 106 corresponds to a preferred example of an offset value calculating unit according to Claims. The above-described operation of determining (calculating) an offset value performed by the offset value calculating unit 106 corresponds to an offset value calculating step as step S5 of FIG. 6.

Based on the offset value calculated by the offset value calculating unit 106, the oscillation command correcting unit 108 corrects the oscillation command calculated by the oscillation command calculating unit 102. More specifically, as described above by referring to FIG. 3, the oscillation command correcting unit 108 adds the offset value calculated by the offset value calculating unit 106 to the amplitude in the oscillation command. The oscillation command correcting unit 108 supplies the oscillation command corrected in this way to the adder 110. This operation is also realized by execution of a program describing this operation by the oscillation command correcting unit 108 by the CPU of the servo controller 100. Specifically, the oscillation command correcting unit 108 is realized by the program describing the operation for correcting an oscillation command and the CPU of the servo controller 100 for execution of this program. This program is stored in a certain storage device in the servo controller 100. Alternatively, it may be stored in an external storage device. A non-transitory computer-readable medium storing this program also corresponds to a preferred example of the non-transitory computer-readable medium storing a computer program according to Claims.

As described above, the oscillation command correcting unit 108 uses the offset value calculated by the offset value calculating unit 106. The oscillation command correcting unit 108 may use an offset value acquired by a different method. For example, the oscillation command correcting unit 108 preferably corrects the oscillation command using an offset value provided from the higher-order controller 200. The offset value mentioned in this embodiment is determined in response to whether the servo motor 400 is in the operation start period S, in the operation termination period T, or in a period other than the operation start period S and the operation termination period T. This determination about a period is preferably made by the offset value calculating unit 106 based on an acceleration. Meanwhile, the higher-order controller 200 having issued the position command as an origin is inherently capable of making this determination. Thus, this determination is also preferably made by the higher-order controller 200 and the higher-order controller 200 preferably outputs an offset value based on the determination. If the higher-order controller 200 outputs an offset value, the oscillation command correcting unit 108 may correct an oscillation command by adding the offset value output from the higher-order controller 200 to the oscillation command (amplitude of the oscillation command). The servo controller 100 may acquire the offset value through an offset value acquiring unit 124 output from the higher-order controller 200. The offset value acquiring unit 124 supplies the acquired offset value to the oscillation command correcting unit 108. The oscillation command correcting unit 108 corrects the oscillation command using the offset value acquired from the higher-order controller 200 in this way, and supplies the corrected oscillation command to the adder 110.

The oscillation command correcting unit 108 corresponds to a preferred example of an offset unit according to Claims. The above-described operation by the oscillation command correcting unit 108 corresponds to an offset step as step S6 of FIG. 6.

<Relationship Between Speed of Servo Motor 400, Acceleration, and Offset>

Figure 4:
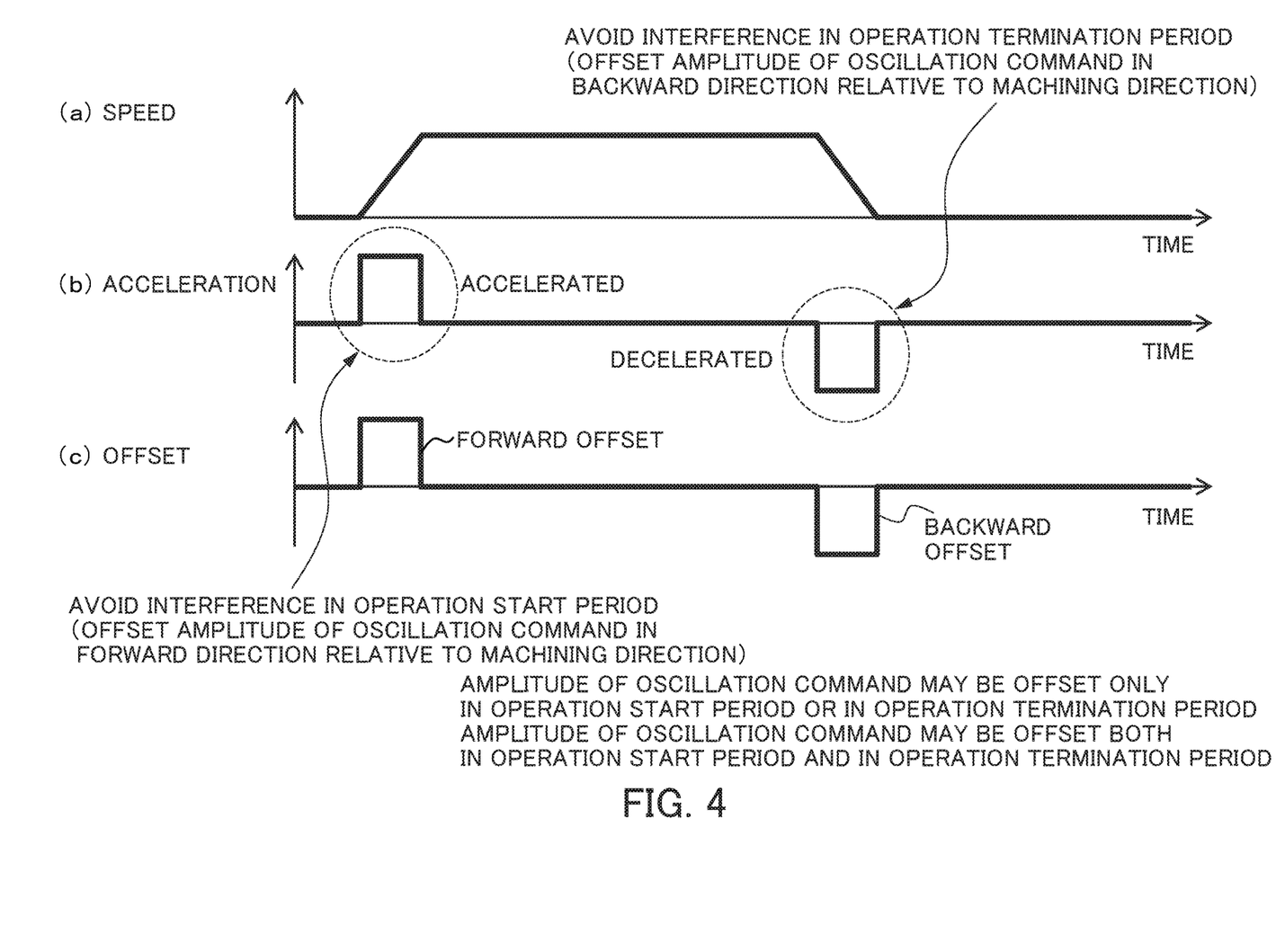
FIG. 4 is a graph showing the operation of the servo controller according to the preferred embodiment of the present invention.

According to this embodiment, an offset value is calculated in each of the operation start period S and the operation termination period T of the servo motor 400. An offset value is not calculated in a period other than the operation start period S and the operation termination period T. In other words, an offset value is determined to be "zero" in a period other than the operation start period S and the operation termination period T. FIG. 4 is a graph showing an exemplary relationship between each of these periods, a speed, an acceleration, and an offset value. In a graph (a) of FIG. 4, a horizontal axis shows time and a vertical axis shows a speed of the servo motor 400. In a graph (b) of FIG. 4, a horizontal axis shows time and a vertical axis shows an acceleration of the servo motor 400. In a graph (c) of FIG. 4, a horizontal axis shows time and a vertical axis shows an offset value. As shown by the graphs of FIG. 4, in the operation start period S, the servo motor 400 is accelerated with a constant acceleration (see the graph (b) of FIG. 4) to operate at an increasing speed (see the graph (a) of FIG. 4). This period where the positive acceleration is generated is determined to be the operation start period S and then an offset is calculated (see the graph (c) of FIG. 4). This calculated offset value in the operation start period S is a positive value showing an offset in a forward direction relative to a machining direction. Thus, this offset value is particularly called a forward offset (see the graph (c) of FIG. 4).

As described above, in the operation start period S, an offset is made in the forward direction relative to the machining direction. Thus, even on the occurrence of oscillation, a probability of deviation of the cutting tool from the machining route (deviation exceeding the position P2 of FIG. 3) can still be reduced. As a result, even if the certain interfering object Q exists near the machining route, a probability of interference with the interfering object Q can still be reduced. As shown by the graphs of FIG. 4, in the operation termination period T, the servo motor 400 is decelerated with a constant negative acceleration (see the graph (b) of FIG. 4) to operate at a decreasing speed (see the graph (a) of FIG. 4). This period where the negative acceleration is generated is determined to be the operation termination period T and then an offset is calculated (see the graph (c) of FIG. 4). This calculated offset value in the operation termination period T is a negative value showing an offset in a backward direction relative to the machining direction. Thus, this offset value is particularly called a backward offset (see the graph (c) of FIG. 4).

As described above, in the operation termination period T, an offset is made in the backward direction relative to the machining direction. Thus, even on the occurrence of oscillation, a probability of deviation of the cutting tool from the machining route (deviation exceeding the position P1 of FIG. 3) can still be reduced. As a result, even if the certain interfering object Q exists near the machining route, a probability of interference with the interfering object Q can still be reduced. In a period "other than the operation start period S and the operation termination period T," an offset value is determined to be "zero" (no offset is made). As described above, this embodiment is characterized in that amplitude of an oscillation command is offset. The offset processing may be executed only in the operation start period S, for example. Conversely, this processing may be executed only in the operation termination period T. As described above by referring to FIGS. 3, 4, etc., the offset processing may be executed both in the operation start period S and the operation termination period T.

<Relationship Between Interfering Object Q and Work 10>

The interfering object Q is not allowed to exist in a command route (machining route) relative to the work 10 (20) as a machining target. In some cases, however, the interfering object Q exists near the command route. The interfering object Q may be of any kind. If a machining target is a screw thread part of a screw, for example, a part of this screw such as a head can be the interfering object Q. As another example, a jig section supporting the work 10 (20) of a cylindrical shape can be the interfering object Q.

Figure 5A:
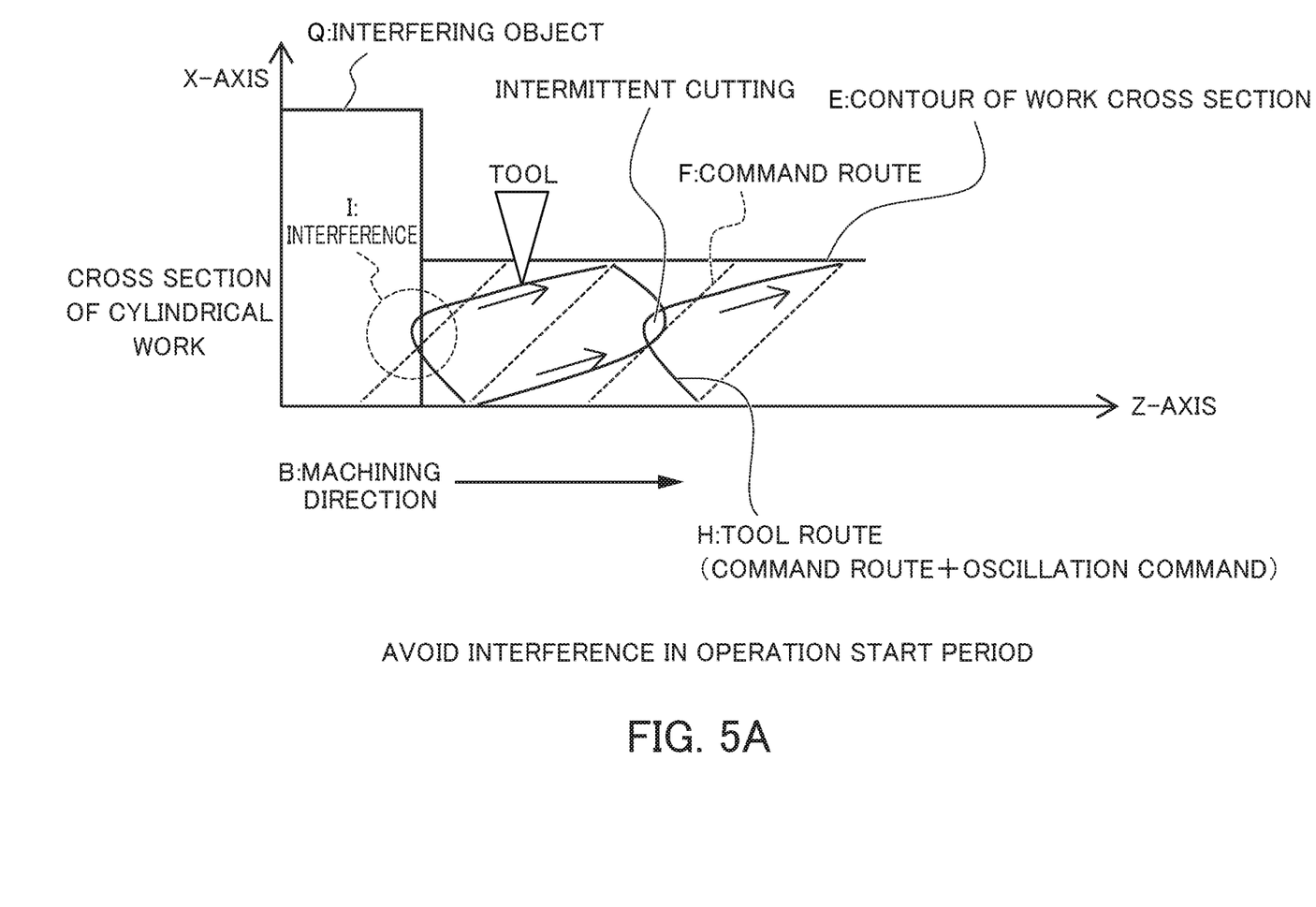
FIG. 5A is an explanatory view showing how a tool is caused to operate by the servo controller according to the preferred embodiment of the present invention.
Figure 5B:
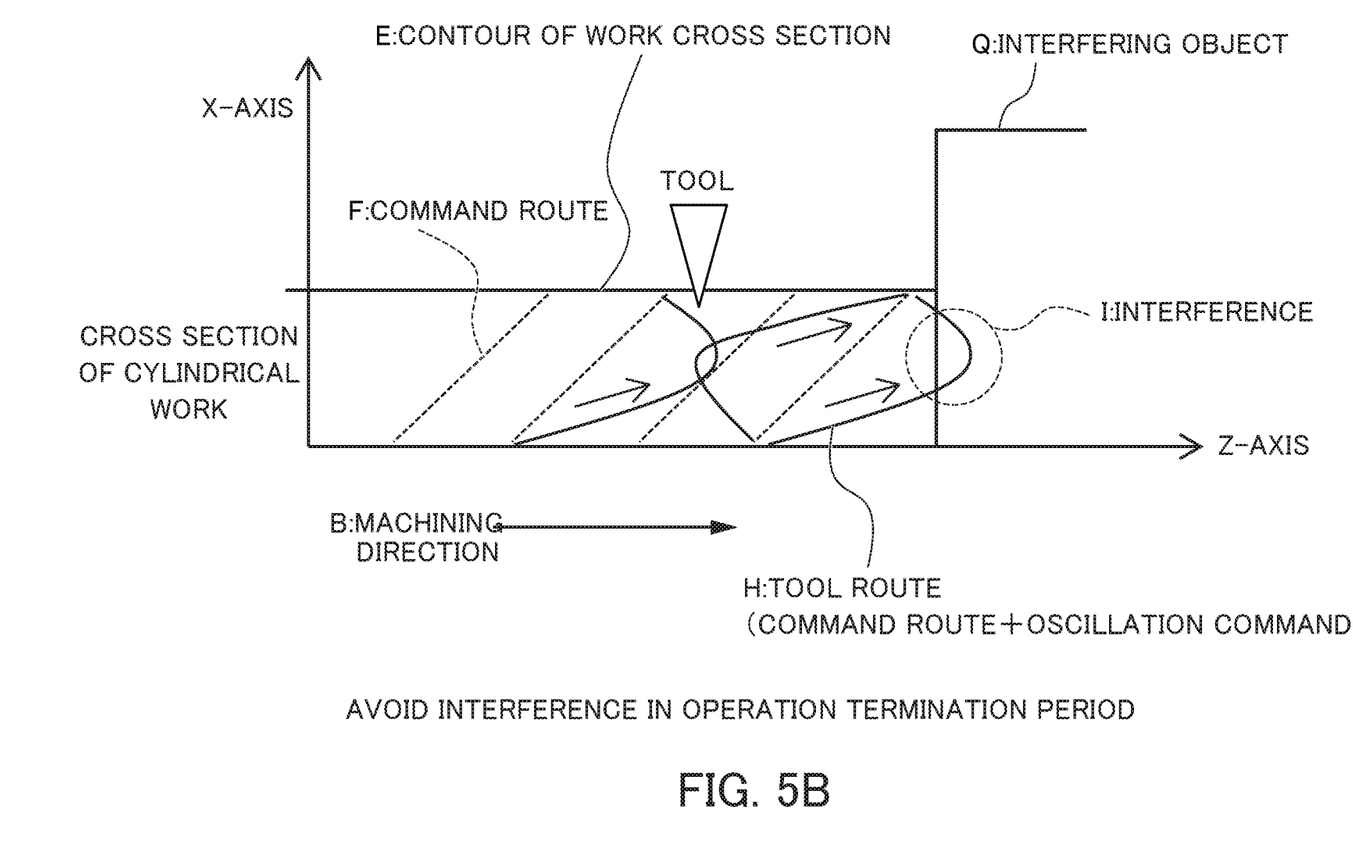
FIG. 5B is an explanatory view showing how the tool is caused to operate by the servo controller according to the preferred embodiment of the present invention.

FIGS. 5A and 5B are explanatory views each showing an exemplary position of the interfering object Q and that of the work 10 (20) relative to each other.

FIG. 5A is a sectional view of the work 10 (20) in a state of being machined in the operation start period S after machining operation on the work 10 (20) is started. An X-axis and a Z-axis of FIG. 5A are on a coordinate system similar to that of FIG. 1A. The machining direction B is defined in the Z-axis direction. FIG. 5A shows a contour E of the cross section of the work. A cutting tool moves on the work 10 (20) along a command route F. Meanwhile, an oscillation command is actually superimposed on a command directed to the cutting tool, so that a tool route H (command route+oscillation command) becomes a curved route as shown in FIG. 5A. During such machining operation, if the interfering object Q such as a jig is attached to a terminal portion of the work 10 (20), the oscillating motion of the cutting tool makes the cutting tool follow the tool route H shifted from the command route F by an amount designated by the oscillation command. This causes a probability that interference I with the interfering object Q will be caused (see FIG. 5A). According to this embodiment, a probability of the interference I is reduced by adding an offset to the oscillation command (amplitude of the oscillation command).

Likewise, FIG. 5B is a sectional view of the work 10 (20) in a state of being machined in the operation termination period T when the machining operation on the work 10 (20) is to be finished. An X-axis and a Z-axis of FIG. 5B are also on a coordinate system similar to that of FIG. 1A. The machining direction B is defined in the Z-axis direction. FIG. 5B shows the contour E of the cross section of the work. The cutting tool moves on the work 10 (20) along the curved tool route H (command route+oscillation command). During such machining operation, if the interfering object Q such as a gripping chuck for gripping of the work 10 (20) is attached to a terminal portion of the work 10 (20), the oscillating motion of the cutting tool causes a probability that the interference I will be caused between the cutting tool and the interfering object Q (see FIG. 5B). According to this embodiment, a probability of the interference I is reduced by adding an offset to the oscillation command (amplitude of the oscillation command). By doing so, the cutting tool becomes less likely to move toward the interfering object Q.

The oscillation command corrected in the above-described manner is added to the position command by the adder 110, and then supplied to the position, speed, and current control unit 116. The adder 110 adds the position command output from the higher-order controller 200, the corrected oscillation command, and the position feedback value, and supplies a resultant value to the position, speed, and current control unit 116. In FIG. 2, the oscillation command as corrected input to the adder 110 is indicated by a minus sign "−." The reason for this is that, according to this embodiment, an oscillation command has polarity in an opposite direction to a position command. The corrected oscillation command may be indicated by "−" or "+" in response to polarity. The position feedback value is a feedback of an actual position of the servo motor 400. Exerting feedback control by feeding back the position of the servo motor 400 is intended to control the servo motor 400 at a more correct position.

Based on the position command including the added oscillation command as corrected, the position, speed, and current control unit 116 determines a drive signal to be used for driving the servo motor 400, and supplies (outputs) the drive signal to an external amplifier 300. Thus, the position, speed, and current control unit 116 and the adder 110 correspond to preferred examples of a driving unit according to Claims. The output of the drive signal made by the position, speed, and current control unit 116 and the adder 110 corresponds to a driving step as step S7 in the flowchart of FIG. 6.

The amplifier 300 amplifies the aforementioned drive signal to supply the servo motor 400 with power sufficient for driving the servo motor 400. The servo motor 400 is driven using the (amplified) drive signal. FIG. 2 shows one amplifier 300 and one servo motor 400. Alternatively, multiple amplifiers 300 and multiple servo motors 400 may be provided. In the case of multi-axis control (in the case of a machine tool including multiple control axes), the number of the amplifiers 300 and that of the servo motors 400 may be determined to conform to the number of the control axes.

The detector 500 is provided to a drive shaft of the servo motor 400. By detecting the position of the servo motor 400, the detector 500 becomes substantially usable for detecting the position of the cutting tool and that of the work. The detector 500 can be configured by using a rotary encoder or a linear encoder, for example. The detector 500 outputs a position feedback value to the position acquiring unit 122. The position acquiring unit 122 is an interface that acquires the position of the servo motor 400 (the position of the cutting tool or that of the work) as the position feedback value. The position feedback value acquired by the position acquiring unit 122 is added to the adder 110. This realizes implementation of what is called feedback control, so that the position of the servo motor 400 and a position determined by the position command can match each other more correctly.

Figure 6:
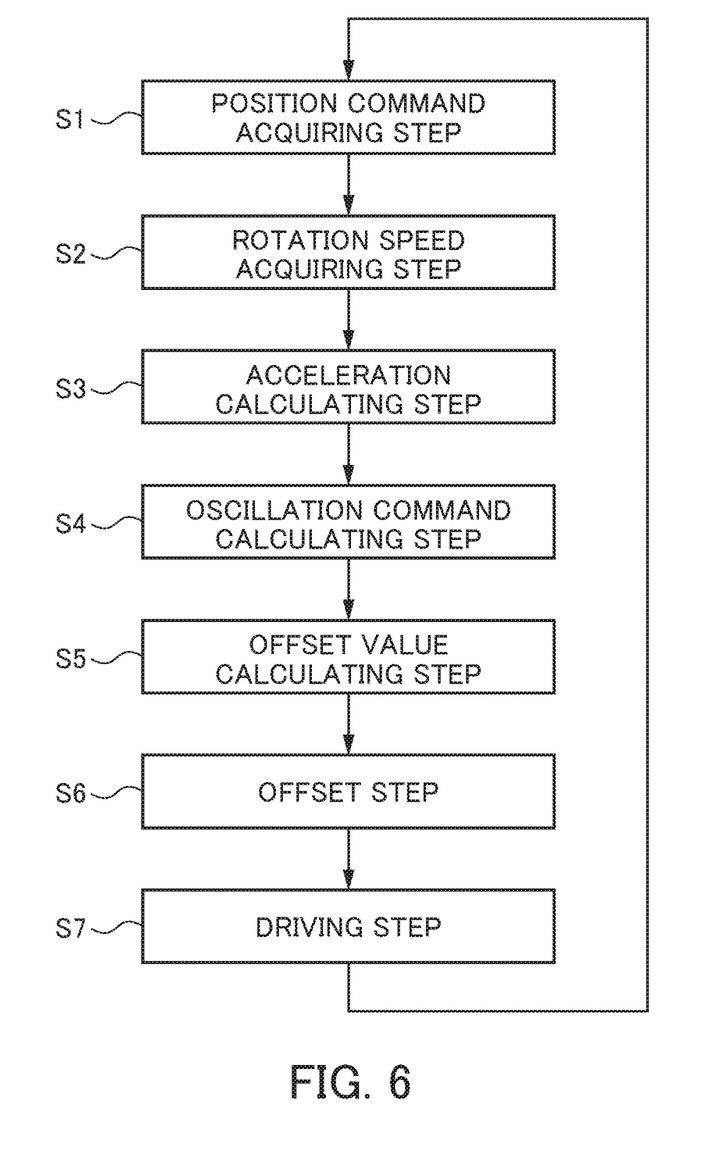
FIG. 6 is a flowchart showing the operation of the servo controller according to the preferred embodiment of the present invention.

In the flowchart of FIG. 6, after the driving step as step S7, a position command output continuously from the higher-order controller 200 is acquired (the position command acquiring step as step S1). Then, the subsequent steps from step S1 are followed repeatedly. Meanwhile, the steps in the flowchart of FIG. 6 are actually executed continuously on an output position command. Thus, each of the steps in FIG. 6 can be executed in parallel as pipeline processing. As described above, the servo controller 100 according to this embodiment causes a servo motor for a machine tool including multiple control axes to perform oscillating motion. In particular, according to this embodiment, an offset is added to amplitude of an oscillation command in an initial period of machining operation (operation start period S) and a termination period of the machining operation (operation termination period T). Such operation can make the interfering object Q existing near a command route (machining route) less likely to interfere with a cutting tool, for example.

Thus, according to this embodiment, the initial period of machining operation (operation start period S) and the termination period of the machining operation (operation termination period T) are required to be determined efficiently. In this regard, according to this embodiment, an acceleration of the servo motor 400 is detected and operation being performed is determined to be operation in the operation start period S or operation in the operation termination period T based on the detected acceleration. By doing so, a determination about each period can be made efficiently and correctly. The higher-order controller 200 to output a position command is inherently capable of knowing the operation start period S and the operation termination period T. Thus, the higher-order controller 200 may be configured to output an offset value based on a determination about such a period. In this case, the oscillation command correcting unit 108 of the servo controller 100 according to this embodiment may use an offset value output from the higher-order controller 200 instead of an offset value calculated by the offset value calculating unit 106 and add the output offset value to an oscillation command, thereby acquiring a corrected oscillation command. If such operation is employed, the servo controller 100 shown in FIG. 2 may be configured not to include the acceleration calculating unit 104 and the offset value calculating unit 106.

<Setting of First Constant and Second Constant>

According to this embodiment, the first constant for multiplication is set at 1.5. Meanwhile, the first constant can be set in a range from 0.5 to 10. Here, oscillation amplitude is generally required to be greater by 0.5 times or more than amplitude that produces a stroke (a stroke in a machining direction) (of the work 10 or the cutting tool 24) determined during one rotation of the spindle axis. A speed of the spindle axis during one rotation can also be estimated using change in the above-described angle of the spindle axis (an angular speed). A speed of move can also be estimated using change in a position command (a speed command). Time required for one rotation of the spindle axis is determined using the estimated angular speed. Thus, a stroke of the work 10 (or the cutting tool) during one rotation of the spindle axis can be determined by multiplying the time of one rotation by the speed command.

Oscillation amplitude can be determined (set) by multiplying the stroke determined in the above-described manner by the first constant. The first constant may be set in such a manner that oscillation amplitude becomes greater by 0.5 times or more than a stroke in a machining direction. Such determination of the first constant can be performed by a human, or by the servo controller 100 or the higher-order controller 200. For example, the first constant is preferably set in a range from a value exceeding 1 to a value less than 2, more preferably, in a range in the neighborhood of 1.5. These ranges of numerical values also correspond to preferred examples of the first constant according to Claims. According to this embodiment, the second constant for multiplication is also set at 1.5 as an example. Meanwhile, the second constant can be set in a range from 0.5 to 10. In particular, the second constant is preferably set in a range from a value exceeding 1 to a value less than 2, more preferably, in a range in the neighborhood of 1.5. These ranges of numerical values also correspond to preferred examples of the second constant according to Claims.

The higher-order controller 200 may be configured to give the first constant and the second constant to the servo controller 100. In this case, the servo controller 100 can store the given first constant and the given second constant into a certain memory in the servo controller 100. A user may set the first constant and the second constant by operating the higher-order controller 200. The user may set these constants by directly operating the servo controller 100.

<Control Over Calculation of Oscillation Command>

The oscillation command calculating unit 102 may calculate various oscillation commands for various purposes. For the purpose of shredding chips caused during cutting, for example, an oscillation command is preferably calculated so as to cause a cutting tool and a work to oscillate relative to each other in a machining direction in which the cutting tool travels.

The oscillation command calculating unit 102 is preferably configured to start, stop, or finish calculation of an oscillation command in response to instruction given from outside. For example, the oscillation command calculating unit 102 may be configured to start, stop, or finish calculation of an oscillation command in response to instruction from the higher-order controller 200 as an external device.

The servo controller 100 is required to have an interface unit for receiving such instruction output from the higher-order controller 200. It is preferable that a different interface such as the rotation speed acquiring unit 118, etc. can be further used as this interface unit.

Like the oscillation command calculating unit 102, the oscillation command correcting unit 108 is preferably configured to start, stop, or finish correction of an oscillation command in response to instruction given from outside. For example, the oscillation command correcting unit 108 may be configured to start, stop, or finish correcting operation in response to instruction from the higher-order controller 200 as an external device. The offset value acquiring unit 124 for receiving an offset value may be used as an interface unit for receiving such instruction output from the higher-order controller 200. Alternatively, a different interface may be prepared.

While the embodiment of the present invention has been shown in detail, the foregoing description of the embodiment merely shows particular examples to be employed for implementing the present invention. The technical scope of the present invention is not to be limited to the above-described embodiment. Various changes of the present invention can be devised in a range not departing from the scope of the invention, and these changes are also covered by the technical scope of the present invention.

EXPLANATION OF REFERENCE NUMERALS 10, 20 Work
12, 22 Spindle axis
14, 24 Cutting tool
100 Servo controller
102 Oscillation command calculating unit
104 Acceleration calculating unit
106 Offset value calculating unit
108 Oscillation command correcting unit
116 Position, speed, and current control unit
118 Rotation speed acquiring unit
120 Position command acquiring unit
122 Position acquiring unit
124 Offset value acquiring unit
200 Higher-order controller
300 Amplifier
400 Servo motor
500 Detector
A Oscillation
B Machining direction
C Move in the air
D Cutting
E Contour of work cross section
F Command route
H Tool route (command route+oscillation command)
I Interference
Q Interfering object S Operation start period
T Operation termination period

What is claimed is:

1. A controller that controls a machine tool comprising multiple control axes and used for machining by cutting of a work as a machining target by means of coordinated motion of the control axes, the controller comprising:
   one or more processors and memory to store one or more programs, the one or more programs comprising instructions for:
   a position command acquiring unit that acquires a position command directed to a servo motor for driving a cutting tool or a position command directed to a servo motor for driving the work;
   a rotation speed acquiring unit that acquires a rotation speed of the rotated cutting tool or that of the rotated work;
   an acceleration calculating unit that calculates an acceleration of the servo motor based on the acquired position command;
   an oscillation command calculating unit that calculates an oscillation command based on the acquired position command and the acquired rotation speed, the calculated oscillation command causing the cutting tool and the work to oscillate relative to each other in a machining direction along a machining route along which the cutting tool travels;
   an offset value calculating unit that calculates an offset value based on the calculated acceleration;
   an offset unit that offsets amplitude of the calculated oscillation command by adding the calculated offset value to the amplitude; and
   a driving unit that determines a drive signal to be used for driving the servo motor based on the oscillation command including the offset amplitude and the acquired position command, and outputs the drive signal.

2. The controller according to claim 1, wherein the oscillation command calculating unit calculates the oscillation command for shredding chips caused during the machining by cutting.

3. The controller according to claim 1, wherein the oscillation command calculating unit comprises:
   an oscillation frequency calculating unit that calculates an oscillation frequency based on the acquired rotation speed; and
   an oscillation amplitude calculating unit that calculates the oscillation amplitude based on the acquired position command and the acquired rotation speed.

4. The controller according to claim 3, wherein the oscillation amplitude calculating unit calculates the oscillation amplitude by determining a stroke during one rotation of the cutting tool or that of the work based on the acquired position command and the acquired rotation speed and by multiplying the determined stroke by a first constant.

5. The controller according to claim 3, wherein the oscillation frequency calculating unit calculates the oscillation frequency by multiplying the acquired rotation speed by a second constant.

6. The controller according to claim 1, wherein the acceleration calculating unit calculates the acceleration based on a position feedback value about the servo motor.

7. The controller according to claim 1, wherein the offset unit offsets the amplitude of the calculated oscillation command by acquiring an offset value from an external higher-order controller instead of using the offset value calculated by the offset value calculating unit and by adding the acquired offset value to the amplitude.

8. The controller according to claim 1, wherein the offset value calculating unit determines an offset value in a direction of the machining route if operation being performed by the servo motor is determined to be operation in an operation start period based on the acceleration.

9. The controller according to claim 1, wherein the offset value calculating unit determines an offset value in a direction opposite a direction of the machining route if operation being performed by the servo motor is determined to be operation in an operation termination period based on the acceleration.

10. The controller according to claim 1, wherein the offset value calculating unit determines an offset value in a direction of the machining route or in a direction opposite a direction of the machining route if operation being performed by the servo motor is determined to be operation in an operation start period or operation in an operation termination period based on the acceleration, and the offset value calculating unit determines an offset value to be zero if the operation being performed is determined to be operation in a period other than the operation start period and the operation termination period.

11. A method of controlling a machine tool comprising multiple control axes and used for machining by cutting of a work as a machining target by means of coordinated motion of the control axes, the method comprising:
   a position command acquiring step of acquiring a position command directed to a servo motor for driving a cutting tool or a position command directed to a servo motor for driving the work;
   a rotation speed acquiring step of acquiring a rotation speed of the rotated cutting tool or that of the rotated work;
   an acceleration calculating step of calculating an acceleration of the servo motor based on the acquired position command;
   an oscillation command calculating step of calculating an oscillation command based on the acquired position command and the acquired rotation speed, the calculated oscillation command causing the cutting tool and the work to oscillate relative to each other in a machining direction along a machining route along which the cutting tool travels;
   an offset value calculating step of calculating an offset value based on the calculated acceleration;
   an offset step of offsetting amplitude of the calculated oscillation command by adding the calculated offset value to the amplitude; and
   a driving step of determining a drive signal to be used for driving the servo motor based on the oscillation command including the offset amplitude and the acquired position command, and outputting the drive signal.

12. A non-transitory computer-readable medium storing a computer program that causes a computer to operate as a controller that controls a machine tool comprising multiple control axes and used for machining by cutting of a work as a machining target by means of coordinated motion of the control axes, the computer program causing the computer to execute:
   a position command acquiring procedure of acquiring a position command directed to a servo motor for driving a cutting tool or a position command directed to a servo motor for driving the work;
   a rotation speed acquiring procedure of acquiring a rotation speed of the rotated cutting tool or that of the rotated work;

an acceleration calculating procedure of calculating an acceleration of the servo motor based on the acquired position command;

an oscillation command calculating procedure of calculating an oscillation command based on the acquired position command and the acquired rotation speed, the calculated oscillation command causing the cutting tool and the work to oscillate relative to each other in a machining direction along a machining route along which the cutting tool travels;

an offset value calculating procedure of calculating an offset value based on the calculated acceleration;

an offset procedure of offsetting amplitude of the calculated oscillation command by adding the calculated offset value to the amplitude; and a driving procedure of determining a drive signal to be used for driving the servo motor based on the oscillation command including the offset amplitude and the acquired position command, and outputting the drive signal.

* * * * *